United States Patent [19]

Ahlstone

[11] 4,124,231
[45] Nov. 7, 1978

[54] RIGID PIPE CONNECTOR WITH RADIALLY SHIFTABLE LOCK ELEMENTS AND METHOD OF MAKING THE SAME

[75] Inventor: Arthur G. Ahlstone, Ventura, Calif.

[73] Assignee: Vetco, Inc., Ventura, Calif.

[21] Appl. No.: 793,523

[22] Filed: May 4, 1977

[51] Int. Cl.² ............................................. F16L 35/00
[52] U.S. Cl. ..................................... 285/18; 285/381; 285/86; 285/322; 285/404; 29/446; 29/525
[58] Field of Search ................. 285/18, 381, 305, 382, 285/382.4, 404, 39, 308, 309, 332, 322, 90, 91, 319, 82, 89, 86; 403/15; 29/427, 446, 525, 526, 157 R

[56] References Cited

U.S. PATENT DOCUMENTS

| | | | |
|---|---|---|---|
| 2,147,343 | 2/1939 | Hokanson | 285/332.4 X |
| 2,671,949 | 3/1954 | Welton | 29/446 |
| 2,784,987 | 3/1957 | Corcoran | 285/82 |
| 3,114,566 | 12/1963 | Coberly et al. | 29/446 X |
| 3,345,087 | 10/1967 | Hanes et al. | 285/90 X |
| 3,912,009 | 10/1975 | Davis | 285/319 X |

FOREIGN PATENT DOCUMENTS 700,115  12/1964  Canada ................................... 285/404

Primary Examiner—Werner H. Schroeder
Assistant Examiner—C. J. Arbes
Attorney, Agent, or Firm—Bernard Kriegel

[57] ABSTRACT

A pipe connector has a pin initially stabbed into a box, the pin and box then being axially loaded together at confronting transverse surfaces while the pin and box are pressurized to expand the box and compress the pin, so that when the pressure is relieved a pressure energized shrink fit is provided and the connector is rendered rigid to enhance tensile, compressive and bending strength and provide a fluid tight joint useful in making up lengths of pipe such as piles and pipelines. Lock means hold the connector against axial separation to maintain the pin under axial compression and maintain the box under axial tension, including circumferentially spaced locking elements projecting radially from one of said pin and box into a locking recess of the other of said pin and box.

18 Claims, 5 Drawing Figures

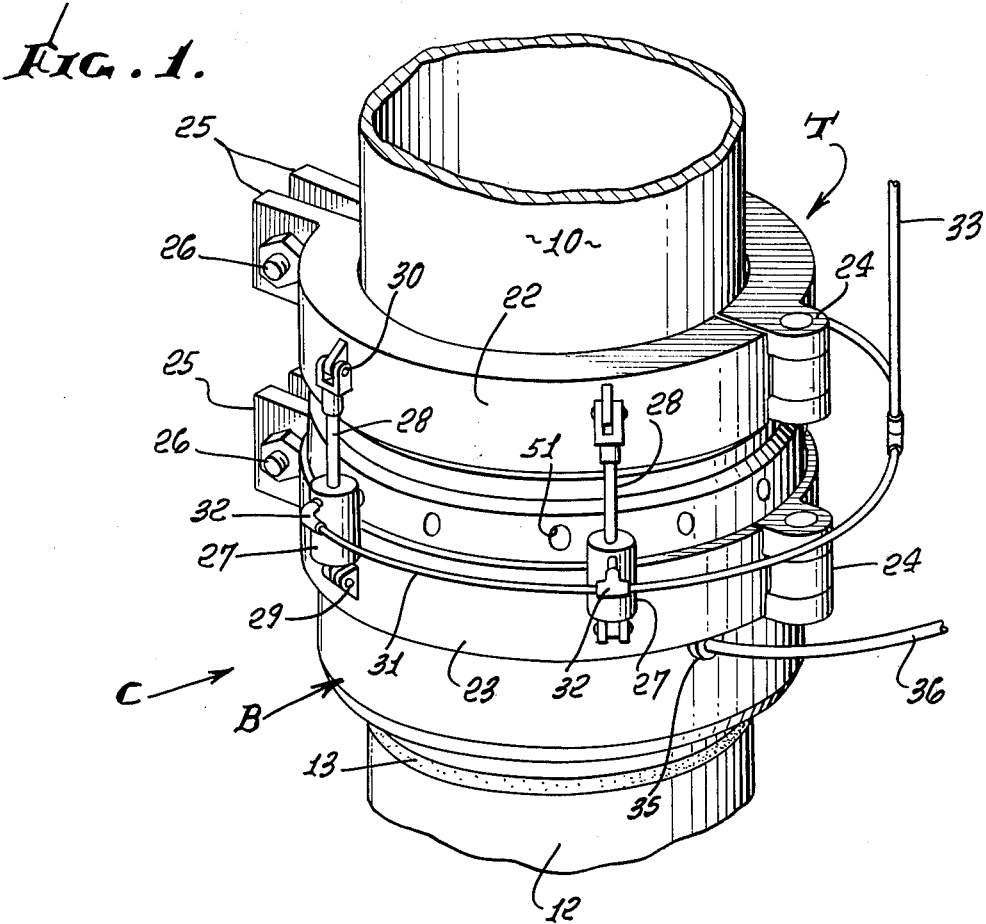
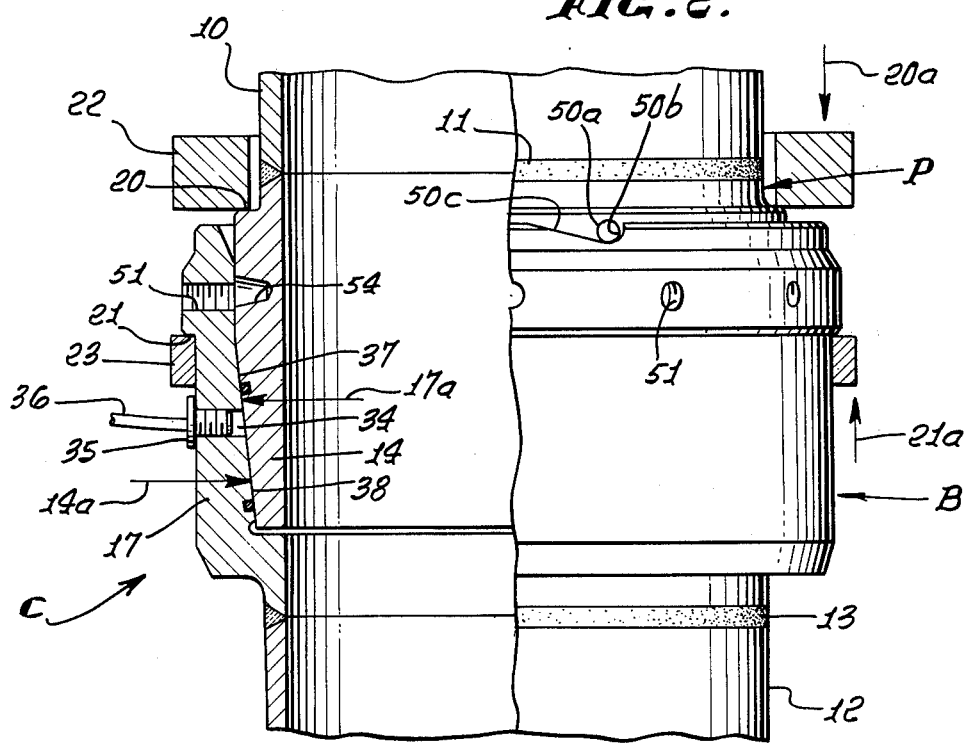

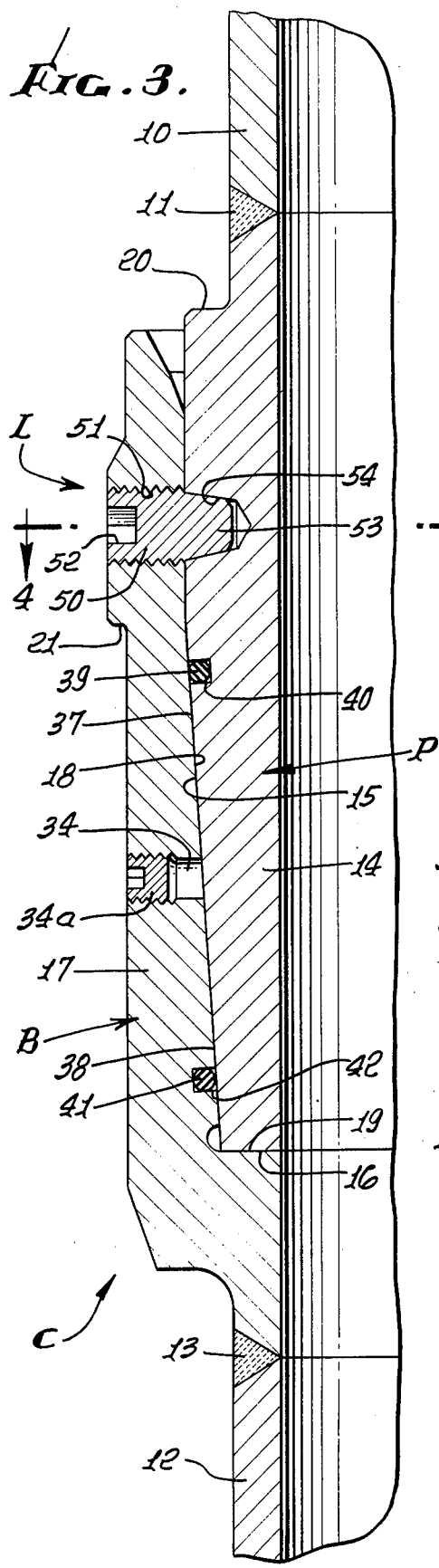
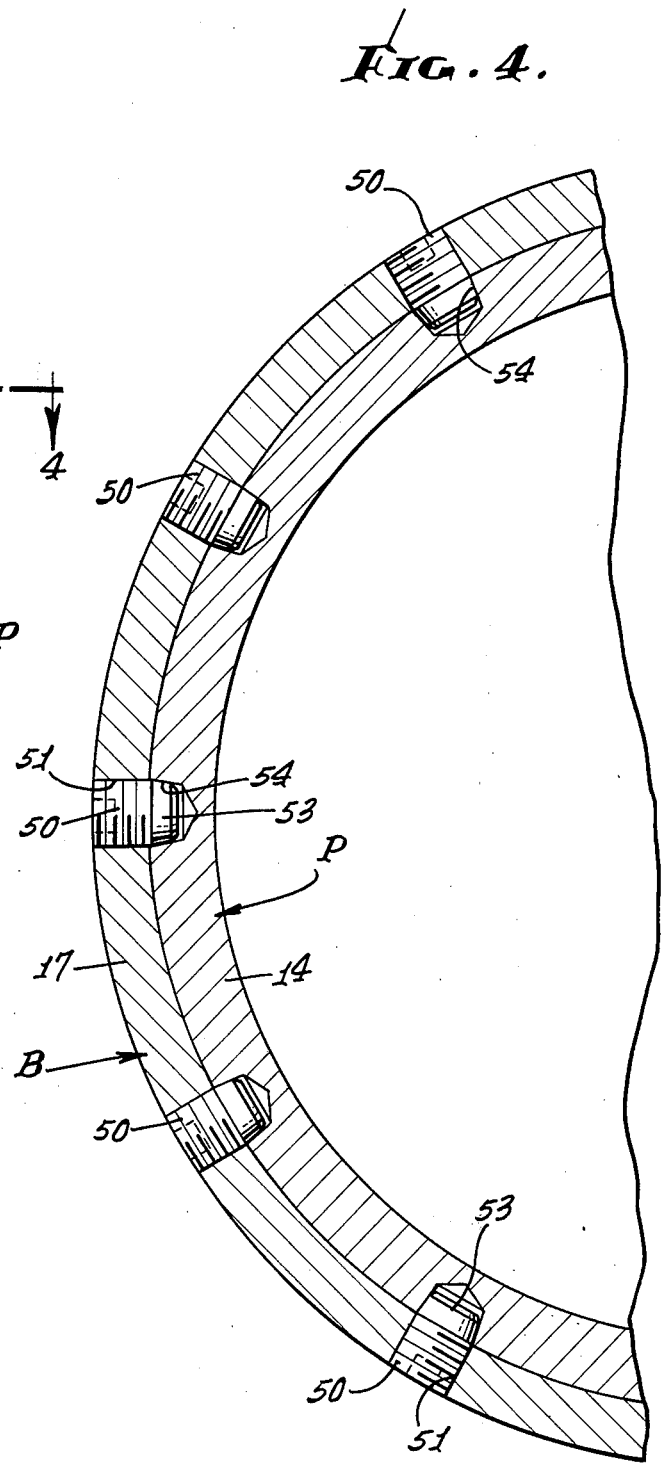

RIGID PIPE CONNECTOR WITH RADIALLY SHIFTABLE LOCK ELEMENTS AND METHOD OF MAKING THE SAME

Heretofore, it has been known that pipe joints or connections may be made up with an interference fit between the pin and the box, by applying fluid pressure between the opposing threaded portions of the pin and the box while the joint parts are rotated to cause the pin and box to shoulder, thereby avoiding the necessity for heating the joint parts to effect a shrink fit. For example, reference may be had to U.S. Pat. No. 2,671,949, granted Mar. 16, 1954, in the name of R. L. Welton, for "Method of Making Tool Joints".

It is also known that pipe line connectors or pile connectors of relatively large diameter can be improved in terms of strength and resistance to separation due to rebound during pile driving operations, if the pin and box are provided with confronting shoulders which are loaded into axial compressive engagement. For example, reference is made to the pending application for U.S. patent Ser. No. 712,491, filed Aug. 9, 1976, in the name of L. E. Reimert, for "Rigid Connector And Piling".

In the pending application of Martin B. Jansen, Jr., Ser. No. 742,072, filed Nov. 5, 1976, there is disclosed a threaded connector for a pipe string, such as a production riser used in connection with sub aqueous wells, in which the threaded connection between the pin member and the box member of the connector is made up initially through an application of relatively low torque to the members, afterwhich the connector has a straight line pretensioning force of a high tensile value applied to it through use of a suitable tool, the high pretensioned force being retained between the mating threads of the pin and box member by a preload reaction member threaded on the pin member and rotated into solid engagement with the box while the pretensioned force is being applied, to lock the preload and the connector between the threads.

In the laying of pipelines, such as offshore pipelines, the joints of pipe are commonly welded, usually on lay barges having work stations for horizontally lining up lengths of pipe, welding the joints, grinding the joints, and subsequent inspection and coating. Such lay barges are very costly, even when used for laying relatively small pipelines in shallow water, and range upwardly, when used for laying larger pipelines offshore.

At the present time, such lay barges may cost up to $350,000.00 per day. When greater water depths are encountered, horizontal pipeline laying becomes impractical, but vertical pipeline installation from semi-submersible rigs constitutes a practical and relatively economical pipeline installation procedure. Welding of the joints or connections is generally preferred, since most connectors are not rigid or are not locked up and must generally be stabbed at a batter angle while the mating joint parts are controlled during makeup by elaborate devices.

There is, accordingly, a need for connectors for pipeline connections and pile connections which can be made up vertically, or with the pipe at a batter angle, say while supported and handled by equipment such as that present on drilling rigs or semi-submersible drilling rigs, which connectors are durable, safe, easy to make up and have pressure resistance, tensile, compression and bending strength characteristics in excess of such characteristics of the pipe body.

The present invention satisfies the need for such connectors by providing a rigid, stab-type connector or pin and box joint which is pre-loaded together axially to force opposed transverse pin and box surfaces into compressive engagement, while the pin and box are subjected to pressure between their confronting or companion interfitting surfaces, to expand the box and compress the pin radially. When the pressure is relieved, the connector is rigid, has an interference fit and is axially pre-loaded so as to have bearing contact for pile driving which resists axial separation due to rebound effects, and has superior tensile, compression, bending and pressure capability, exceeding that of the pipe joined by the connector. Such joints are, therefore, idealy suited for, but not limited to, use in marine piles and pipelines.

In accomplishing the foregoing, the connector has a box section having an internal transverse surface or shoulder and is adapted to have a pin section inserted therein with the inner transverse end surface of the pin disposed for abutting engagement with the shoulder in the box. Axially spaced companion tapered metal sealing surfaces in the box and on the pin are coengaged, and if desired supplemental ring seals may be provided between the metal-to-metal sealing surfaces. The box has a pressure fitting enabling fluid to be supplied under pressure between the pin and box within the region spanned by the sealing portions to pressure energize the box and pin and effect resilient expansion of the box and contraction of the pin, while a pre-load tool is applied to opposing radial shoulders or tool engaging projections on the box and on the pin. Actuation of the tool enables the connector to be finally or fully made up with a predetermined compressive load on the coengaged box and pin transverse surfaces or shoulders, with the box under tension and the pin under compression, and when the energizing pressure on the box and pin is then released, while the parts are held in the pre-loaded condition by the pre-load tool, the box contracts and the pin expands to provide an interference or shrink fit interlocking the connector parts together in their pre-loaded condition.

As disclosed in my companion application, Ser. No. 726,947, filed May 4, 1977, for "Rigid Connector for Pipe and Method of Making the Same", the box and pin are held in the preloaded condition by the interference fit of opposed tapered surfaces and including in some forms, locking means, shown as threads or ribs, which prevent axial separation of the pin and box or relaxation of the compressive pre-load, even during rebound when the connector is used in a pile subjected to the blows of a pile driver. The tapered metal-to-metal sealing surfaces prevent leakage from or into the joint and the combination of the axial pre-load, and the pressure energized fit provides a connector having the advantageous characteristics described above.

According to the present invention, locking means coact between the upper end of the tapered pin section and the upper or free end of the tapered box section to hold the confronting, axially pre-loaded shoulders together, with the pin in compression and the box in tension, whereby the connector maintains its rigidity. The locking means comprise radially shiftable circumferentially spaced locking elements engageable between the pin and box members. The elements, according to one illustrative form, are screws with tapered noses engaged in companion tapered recesses, and according to another illustrative form, are latch fingers having ends engaged in a companion recess.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 1 is a perspective illustrating a pipe and a connector during assembly and in a clamping tool for axially loading the connector while it is pressurized;

FIG. 2 is a partial elevation and partial longitudinal section of one form of pipe connector, with the clamping tool broken away, and showing the connector parts stabbed together prior to final makeup;

FIG. 3 is an enlarged fragmentary longitudinal section of the pipe connector of FIG. 2 in a fully made up and locked condition;

FIG. 4 is a reduced fragmentary section taken on the line 4—4 of FIG. 3; and

Figure 5:
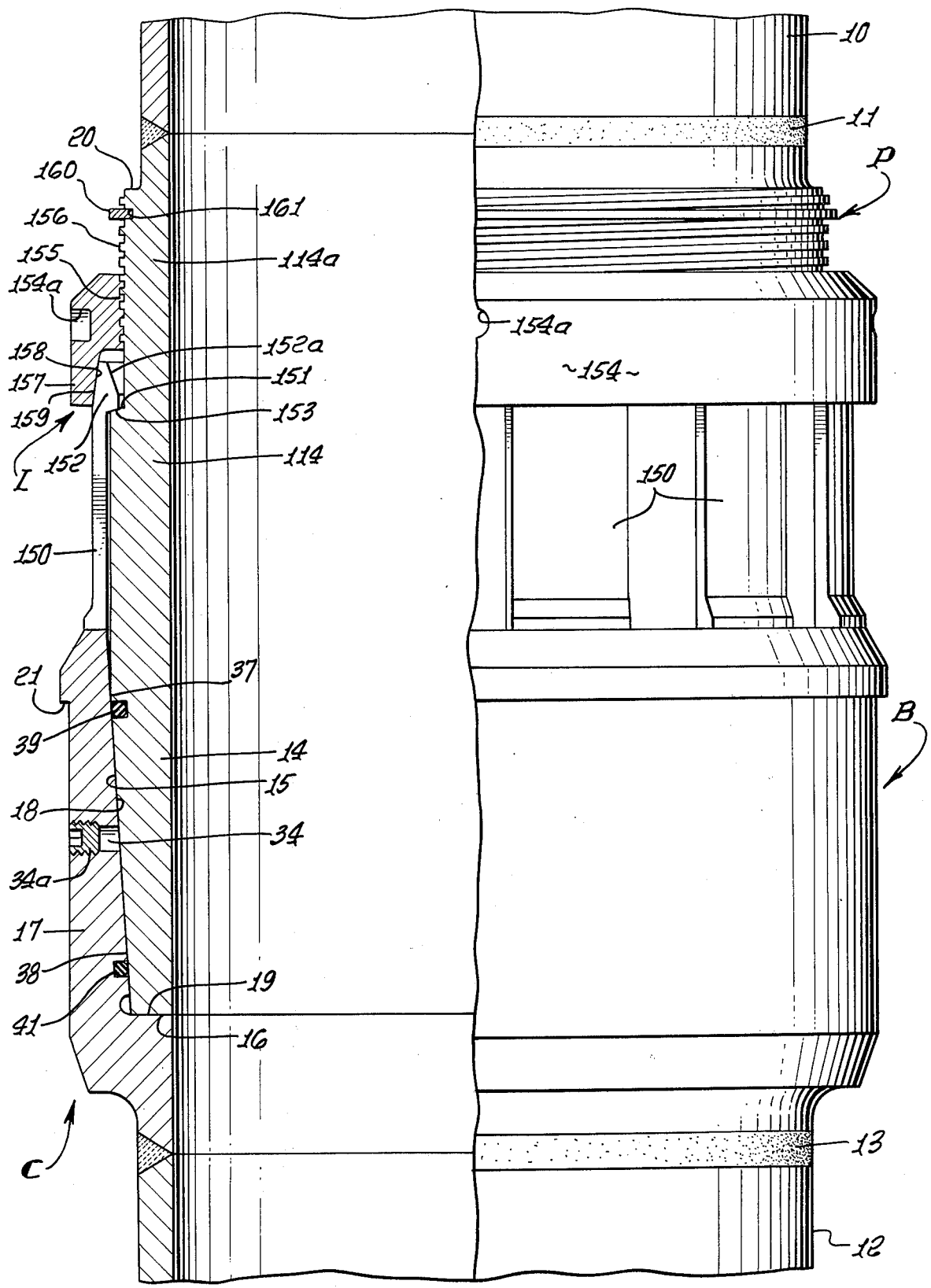
FIG. 5 is a partial elevation and partial longitudinal section of another form of pipe connector.

As seen in the drawings, a pipe connector C made in accordance with the invention, comprises an upper pin section P and a lower box section B adapted to interconnect pipe lengths, including an upper pipe section 10, secured by a circumferentially continuous weld 11 to the upper end of the pin P, and a lower pipe section 12, secured by a circumferentially continuous weld 13 to the lower end of the box section B. The connector C is shown and will be described as one wherein the connection is stabbed together by insertion of the downwardly extending pin into the upwardly facing box. It should be understood, however, that in the case of some uses of the connector, this relationship of pin to box may be reversed and the box moved over the pin. Preferably, the inner, upper end of the box B is outwardly flared to facilitate stabbing of the pin into the box, and the tapered form of the parts progressively aligns the parts, as the pin moves into the box. The taper angle is preferably a locking angle.

The pin section P includes a circular body section 14 having an external downwardly tapering surface 15 and a lower end surface 16 which extends transversly of the pin body 14. The box section B comprises a circular body section 17 having an internal downwardly tapered surface 18 complemental to the tapered surface 15 of the pin body, whereby when the pin body is inserted or stabbed into the box, the complemental tapered surfaces 15 and 18 are disposed in confronting coengagement. The box body 17 also includes an inner lower transversely extended shoulder or surface 19 against which the pin surface 16 abuts when the connector is made up. The strength of such joints, as thus far described, in terms of resistance to axial separation or tensile strength, compressive and bending strength, as well as the ability of the connector to withstand fluid pressure, both from within and from without, is dependent upon the extent to which the confronting transverse surfaces 16 and 19 are axially preloaded and the extent to which there is a tight interference fit between the confronting tapered surfaces 15 and 18 of the respective pin and box members.

The present invention provides a joint of superior strength characteristics by reason of the fact that the pin and box sections of the joint or connector are made up in a novel manner. In the vicinity of the upper end of the pin body 14, it is provided with a radially extended, upwardly facing, thrust or pre-load shoulder 20, and adjacent the upper end of the box body 17, it is provided with an external radially outwardly projecting, downwardly facing, thrust shoulder 21. These thrust or pre-load shoulders 20 and 21 are adapted to provide means engageable by a suitable makeup or loading tool T, whereby as indicated by the respective arrows 20a and 21a in FIG. 2, a compressive axial force can be applied to the pin body 14 to load the pin end 16 against the inner box surface 19 while the box body 17 is under tension.

The tool T may be of any suitable form to provide opposing forces as represented by the arrows 20a and 21a, and as illustrated in FIG. 1, such a tool may comprise an upper ring 22 and a lower ring 23, each of the rings 22 and 23 having suitable hinge means 24 hingedly interconnecting ring half parts together so that the ring may be opened for lateral application about the pipe and about the connector. Each ring 22 and 23 also is provided with suitable means, such as outstanding ears 25, at the free ends of the ring half parts, and adapted to receive bolts 26 whereby the rings 22 and 23 may be assembled and secured about the pipe and connector for engagement with the respective thrust shoulders 20 and 21 on the pin and on the box. Means are provided for pulling the rings 22 and 23 axially towards one another, when the rings are disposed about the pipe and connector, so as to apply the opposite forces referred to above. As shown, the pulling means comprises a suitable number of circumferentially spaced hydraulic cylinders 27 having rods 28 projecting therefrom, with the respective cylinders connected to one of the rings as at 29 and the rods connected to the other of the rings as at 30. A hydraulic line 31 is adapted through suitable fittings 32 to supply hydraulic fluid under pressure to the cylinders 27 from a source conduit 33 which is connected to the conduit 31 and to a suitable fluid pressure source (not shown). Thus, when hydraulic fluid is supplied to the cylinders 27 to retract the rods 28 and force the rings 22 and 23 towards one another, the pin and box bodies 14 and 17 can be axially preloaded.

In addition, as mentioned above, the strength of the connector is also dependent upon the interference fit between the opposing tapered pin surface 15 and box surface 18. Accordingly, the box body 17 is provided with at least one radial pressure port 34 threaded to receive a connector fitting 35 for a hydraulic line 36, whereby fluid under pressure can be supplied between the confronting tapered surfaces 15 and 18 of the pin and box between an upper opposed sealing region 37 and a lower opposed sealing region 38 between the tapered pin and box surfaces. The sealing effectiveness of the upper and lower tapered, metal-to-metal sealing regions 37 and 38 may be enhanced by the provision of an upper, annular and resilient sealing ring 39 disposed in a groove 40 in the pin or the box body and a lower, annular and resilient sealing ring 41 disposed in a groove 42 in the pin or the box body, the sealing rings 39 and 41 being sealingly engaged with the opposed tapered surfaces of the respective members.

As seen in FIG. 2, and somewhat exaggerated, when the pin P is stabbed into the box B to the extent that a seal is provided at the upper and lower sealing regions 37 and 38 therebetween, the lower end 16 of the pin P is not fully axially loaded against the confronting box shoulder 19, and as previously indicated, such loading is accomplished in response to the application of the opposing forces by the loading tool T. During the operation of the tool T to axially pre-load the connector, hydraulic fluid under pressure is admitted through the port 34, between the upper and lower sealing regions 37 and 38, sufficient to apply substantial circumferential compressive force to the pin body 14, as indicated by the arrow 14a in FIG. 2, and substantial expansive force, as indicated by the arrow 17a, to the body 17 of the box.

The connector is finally made up while the fluid pressure is maintained, by actuation of the tool T to axially load the confronting pin and box surfaces 16 and 19, while the pin body 14 is under compression and the box body 17 is under tension. Accordingly, when the fluid pressure is relieved there will be effected a pressure energized interference fit between the tapered pin surface 15 and box surface 18, while the confronting transverse surfaces 16 and 19 of the pin and box are in an axially preloaded condition. As a result, the completed joint or connector, as seen in FIG. 3, will have superior strength characteristics in terms of tensile, compressive and bending strength and a fluid tight joint is provided which is useful in making up lengths of pipe such as piles and pipelines.

When the hydraulic line connector 35 has been removed from the pressure port 34, it is preferred that the port 34 be pluged by a suitable screw plug 34a as seen in FIG. 3.

Such a connection of pipe sections 10 and 12 can be easily and quickly made with the usual pipe handling equipment found on drilling barges and the like and with the pipe sections disposed vertically or at batter angles while being initially stabbed together and the making up of the connection can be accomplished more quickly than welded connections have been heretofore made. Thus, the invention not only provides a strong and durable connection which can withstand the severe service of subsea pipelines and piles, but economies are effected in terms of the speed with which the connections can be made up utilizing the very expensive rig or barge equipment.

The present invention involves locking means L cooperatively engageable between the pin and the box in such a manner that the pin body section 14 is held compressively with its end surface 16 engaged with the opposing shoulder 19 of the box, and with the box body section 17 held in tension, while the tapered pin and box surfaces are coengaged by the pressure energized shrink fit, upon the relief of the pressure fluid from the region between the opposed metal-to-metal sealing sections 37 and 38.

Referring to FIG. 3, the finally made up connection C is better illustrated on an enlarged scale. In this form, the locking means L comprises a plurality of circumferentially spaced locking elements 50 carried by one of the pin and box members and engaged with the other of the pin and box members to lock them together against axial separation when the compressive preload applied by the tool T and the energizing fluid pressure have been relieved. Above the upper sealing region 37 of the connector and above the downwardly facing thrust shoulder 21 of the box body 17, the box is provided with a suitable number of circumferentially spaced, radially extended internally threaded screw holes 51, adapted to receive the locking elements 50, which are in the form of externally threaded screw members having suitable tool receiving or engaging means 52 for rotating the elements 50 and causing them to be moved radially with respect to the box body 17. At the inner ends of the locking elements 50 are frusto-conical nose portions 53 adapted to be engaged in companion frusto-conical recesses or seats 54 formed in the pin body 14.

During the initial stabbing of the pin into the box, the locking elements 50 are backed out of the threaded bores 51 so that the inner ends of the noses 53 provide no obstruction to the entry of the pin P into the box. Radial alignment of the screws 50 with the recesses 54 is established visually or by suitable means, shown in FIG. 2 as a radially projecting pin 50a carried by the pin and engageable with a radial shoulder 50b on the box. A ramp 50c is provided in the pin leading downwardly from the upper end of the box to the shoulder 50b.

When the pin P is initially seated in the box, so that the upper sealing region 37 and the lower sealing region 38 enable the application of pressure through the port 34, and the preload tool T is applied to the thrust shoulders 20 and 21 to axially preload the connector, the recesses 54 in the pin will be moved longitudinally relative to the box and brought into radial alignment with the locking elements 50, so that a suitable tool applied to the locking elements to rotate the same can thread the locking elements 50 inwardly causing the noses 53 to be compressively loaded into the tapered pin recesses 54. Thus, when the fluid pressure between the pin and box is relieved and the preloading tool T is removed, the connector will be interlocked by the elements 50, with the pin body 14 in compression and the box body 17 in tension, the inner end 16 of the pin being maintained in its axially preloaded condition against the box shoulder 19 and the opposing tapered pin and box surfaces 15 and 18 being tightly held together by the pressure energized interference fit.

As seen in FIG. 5, the locking means L comprises a plurality of elongated latch arms or fingers, integral with or made a part of the upper end of the box and extending longitudinally, in circumferentially spaced relation along an upward extension 114 of the pin body 14. The upward extension 114 of the pin has an upwardly facing shoulder 151 extending circumferentially thereabout, and at the respective upper end of each latch finger 150 is an inwardly projecting tip or lug 152 having a downwardly facing shoulder 153 adapted to lockingly coengage with the upper facing pin shoulder 151, as will be later described.

Means are provided for forcing the lugs 152 radially inwardly into locking engagement with the pin shoulder 151, and as shown, this means comprises an actuator ring or body 154 having an internal square or acme thread 155 engaged with the complemental thread 156 on the reduced diameter section 114a of the upward pin body extension. The actuator ring or body 154 has a downwardly extended skirt 157 provided with an internal, downwardly and outwardly inclined circular wall 158 adapted to engage the upwardly and inwardly inclined surfaces 159 at the top of the latch fingers 150, whereby threaded rotation of the ring 154 on the pin will wedge the latch lugs 152 inwardly into locking coengagement with the pin shoulder 151.

The pin shoulder 151 is disposed at an angle extending downwardly and outwardly from the reduced diameter section 114a of the body and the under surfaces or shoulders 153 of the latch lugs 152 are correspondingly inclined downwardly and outwardly to provide a wedge action, when the skirt 157 forces the lugs 152 inwardly with respect to the pin. This wedge action compressively loads the pin body 114 to prevent relaxation of the connector following release of the fluid pressure from between the pin and box parts and removal of the loading tool T from the connector.

In order to prevent inadvertent removal of the threaded ring or body 154 from the pin body section 114*a*, the latter is provided with a suitable stop shoulder formed by a split ring 160, seating in a circumferentially extended groove 161 below the upwardly facing thrust shoulder 20 on the pin body.

When the connector C of FIG. 5 is to be stabbed together, the threaded ring 154 is threaded upwardly against the stop shoulder 160, and the locking finger elements are free at their upper ends to be resiliently deflected outwardly as the pin P is stabbed into the box B. The upper inner corners of the lugs 152 are downwardly and inwardly beveled at 152*a*, so that the fingertips will be resiliently deflected outwardly by the wedging action of the pin, as it passes between the locking fingers into the box. When the pin extends sufficiently into the box to effect a seal at the upper and lower sealing regions 37 and 38, fluid pressure can be supplied through the port 34 and the preloading tool T applied to the upwardly facing shoulder 20 on the pin and the downwardly facing shoulder 21 on the box. The connector is thus axially preloaded and pressure energized, and the latch lugs 152 will automatically move into engagement with the upwardly facing pin shoulder 151. With the connector in the preloaded condition, the actuator screw collar 154 is threaded downwardly on the pin by use of a suitable tool (not shown) applicable to one or a plurality of circumferentially spaced tool engaging recess means 154*a* provided in the collar 154. The wedge action of the tapered surface 158 on the sleeve 157 upon the companion tapered surfaces 159 on the latch lugs will force the upper ends of the fingers radially inwardly, thereby loading the opposed angular surfaces 151 and 153 on the pin and on the latch lugs into a preloaded condition. This preloaded condition will resist separation of the connector parts when the preloading tool T is removed and the pressure is relieved from between the parts to provide the pressure energized interference fit.

From the foregoing it will now be apparent that the present invention provides a pipe connector for use in making up lengths of pipe such as piles and pipelines wherein the pressure energization of the fit between the tapered pin and box members and the axial preloading of the pin P against the inner shoulder of the box while the box is held in tension results in the production of a rigidized pipe joint of superior strength and durability and which can be readily and quickly made up utilizing the usual pipe handling and supporting equipment provided on drilling rigs and barges and with the pipe sections disposed vertically or at some batter angle. The locking means hold the parts against axial separation.

I claim:

1. A rigid pipe connector comprising: a pin and a box; said pin having an externally tapered section and a transverse make up shoulder; said box having an internally tapered body section to receive the tapered section of said pin and having an open end and an inner transverse make up shoulder confronting said pin make up shoulder; said pin section and said box section having therebetween axially spaced companion tapered sealing portions; said box section having port means between said sealing portions for admission therebetween of a pressure fluid acting to circumferentially expand said box section and compress said pin section; and means on said pin and box engageable by a loading tool for axially relatively forcing said sections and compressively loading said make up shoulders while said pressure fluid is acting on said sections; said pin and box sections being held against axial separation with said make up shoulders in compression and said box section in tension by a pressure energized shrink fit between said pin section and said box section upon relief of said pressure fluid; and locking means coacting between said pin and box to hold said pin in compression and said box in tension, said locking means comprising circumferentially spaced locking elements projecting radially from one of said pin and box and lockingly engaged with the other of said pin and box.

2. A rigid pipe connector as defined in claim 1; said locking elements being engaged between said pin and box at the open end of said box.

3. A rigid pipe connector as defined in claim 1; said locking elements being engaged between said pin and box at the open end of said box and being compressed axially of said pin and box.

4. A rigid pipe connector as defined in claim 1; said locking elements comprising screws threaded in radial holes in said box adjacent the open end thereof, said pin having a radial recess, said screws having an inner end engaged in said recess.

5. A rigid pipe connector as defined in claim 1; said locking elements comprising screws threaded in radial holes in said box adjacent the open end thereof, said pin having a radial recess, said screws having an inner end engaged in said recess, said inner end of said screws and said recess being correspondingly tapered to compress said inner end of said screws in said recess.

6. A rigid pipe connector as defined in claim 1; said locking elements comprising screws threaded in radial holes in said box adjacent the open end thereof, said pin having a radial recess, said screws having an inner end engaged in said recess, said inner end of said screws being frusto-conical and said recess being correspondingly frusto-conical.

7. A rigid pipe connector as defined in claim 1; said locking elements comprising screws threaded in radial holes in said box, said pin having radial recesses for receiving the inner ends of said screws, and including means for orienting said pin and said box with said screws and holes in radial alignment when said pin and box are stabbed together.

8. A rigid pipe connector as defined in claim 1, said locking elements comprising latch fingers carried at the open end of said box and having inwardly projecting lugs at the tips of said fingers, and a locking shoulder on said pin engaged by said lugs.

9. A rigid pipe connector as defined in claim 1, said locking elements comprising latch fingers carried at the open end of said box and having inwardly projecting lugs at the tips of said fingers, and a locking shoulder on said pin engaged by said lugs, said pin having a ring shiftable axially thereon from a position clearing said finger tips when said pin and box are preloaded by said loading tool to a position holding said lugs in locking engagement with said locking shoulder.

10. A rigid pipe connector as defined in claim 1, said locking elements comprising latch fingers carried at the open end of said box and having inwardly projecting lugs at the tips of said fingers, and a locking shoulder on said pin engaged by said lugs, said pin having a ring shiftable axially thereon from a position clearing said finger tips when said pin and box are preloaded by said loading tool to a position holding said lugs in locking engagement with said locking shoulder, said ring and said finger tips having companion tapered surfaces wedging said lugs into locking engagement with said locking shoulder upon axial movement of said ring to said position holding said lugs.

11. A rigid pipe connector as defined in claim 1, said locking elements comprising latch fingers carried at the open end of said box and having inwardly projecting lugs at the tips of said fingers, and a locking shoulder on said pin engaged by said lugs, said pin having a ring shiftable axially thereon from a position clearing said finger tips when said pin and box are preloaded by said loading tool to a position holding said lugs in locking engagement with said locking shoulder, said ring and said finger tips having companion tapered surfaces wedging said lugs into locking engagement with said locking shoulder upon axial movement of said ring to said position holding said lugs, and said lugs and said locking shoulder being disposed at an angle axially compressing said lugs between said ring and said locking shoulder.

12. A rigid pipe connector as defined in claim 1, said locking elements comprising latch fingers carried at the open end of said box and having inwardly projecting lugs at the tips of said fingers, and a locking shoulder on said pin engaged by said lugs, said pin having a ring shiftable axially thereon from a position clearing said finger tips when said pin and box are preloaded by said loading tool to a position holding said lugs in locking engagement with said locking shoulder, said ring and said finger tips having companion tapered surfaces wedging said lugs into locking engagement with said locking shoulder upon axial movement of said ring to said position holding said lugs, said ring being threaded on said pin for movement between said positions.

13. A rigid pipe connector as defined in claim 1, said locking elements comprising latch fingers carried at the open end of said box and having inwardly projecting lugs at the tips of said fingers, and a locking shoulder on said pin engaged by said lugs, said pin having a ring shiftable axially thereon from a position clearing said finger tips when said pin and box are preloaded by said loading tool to a position holding said lugs in locking engagement with said locking shoulder, said ring and said finger tips having companion tapered surfaces wedging said lugs into locking engagement with said locking shoulder upon axial movement of said ring to said position holding said lugs, and said lugs and said locking shoulder being disposed at an angle axially compressing said lugs between said ring and said locking shoulder, said ring being threaded on said pin for movement between said positions.

14. The method of making rigid pipe connections comprising: axially coengaging tapered pin and tapered box connector parts and disposing opposing axially spaced sealing portions thereof in sealing relation and transversely disposed makeup shoulders thereof in opposing initial confronting relation, compressively loading said makeup shoulders together by applying opposite axial forces to said pin and box placing said pin in compression and said box in tension while circumferentially expanding said box and compressing said pin by the application of pressure fluid therebetween between said sealing portions thereof, locking said pin and box together with said pin in compression and said box in tension by making up an interlock at circumferentially spaced locations between the open end of said box and a locking shoulder on said pin facing outwardly with respect to said end of said box, and then relieving said pressure fluid to allow shrinking of said box and expansion of said pin into interlocking relation.

15. The method of claim 14; said interlock being made up by moving lock elements carried by said box radially into compressive engagement with said locking shoulder from retracted positions allowing stabbing of said pin into said box.

16. The method of claim 14; said interlock being made up by threading locking screws radially inward from retracted positions allowing stabbing of said pin into said box into circumferentially spaced recesses in said pin aligned with said screws.

17. The method of claim 14; said interlock being made up by positively moving normally releasable latch elements into locking engagement with said locking shoulder and retaining said latch elements against release.

18. The method of claim 14; said interlock being made up by positively moving normally releasable latch elements into locking engagement with said locking shoulder and retaining said latch elements against release while compressing axially of said connector the portions of said latch elements engaged with said locking shoulder.

* * * * *